United States Patent [19]

Hardison et al.

[11] 4,289,505

[45] Sep. 15, 1981

[54] SOLVENT RECOVERY FROM WATER

[75] Inventors: Leslie C. Hardison, Barrington; Joseph P. Eng, Schaumburg; Gary J. Nagl, Roselle, all of Ill.

[73] Assignee: Air Resources, Inc., Palatine, Ill.

[21] Appl. No.: 159,303

[22] Filed: Jun. 13, 1980

[51] Int. Cl.³ .................... B01D 53/06; C02F 1/28
[52] U.S. Cl. .......................................... 55/59; 55/74; 55/180; 55/198; 55/387; 210/669; 210/694
[58] Field of Search ................ 55/59, 74, 179, 180, 55/198, 228, 242, 387, DIG. 46; 98/115 SB; 210/669, 694

[56] References Cited

U.S. PATENT DOCUMENTS

| | | | |
|---|---|---|---|
| 1,753,067 | 4/1930 | Ray et al. | 55/59 X |
| 2,327,779 | 8/1943 | Fisher et al. | |
| 2,428,885 | 10/1947 | Luaces | 55/59 X |
| 2,722,999 | 11/1955 | Bratzler et al. | 55/180 |
| 3,395,972 | 8/1968 | Hardison | |
| 3,448,042 | 6/1969 | Mattia et al. | |
| 3,625,886 | 12/1971 | Mattia | |
| 3,731,460 | 5/1973 | Narumi | 55/198 X |
| 3,905,783 | 9/1975 | Winter et al. | 55/74 X |
| 4,056,369 | 11/1977 | Quackenbush | 55/74 X |
| 4,074,984 | 2/1978 | Fuhring | 55/179 X |
| 4,211,541 | 7/1980 | Fernandez | 55/74 X |

*Primary Examiner*—Robert H. Spitzer
*Attorney, Agent, or Firm*—Merriam, Marshall & Bicknell

[57] ABSTRACT

A bed of spent solid adsorbent material previously used for removal of mixed solvent vapors from an air stream is steam stripped; the mixture of steam and vaporized solvent is passed through a condenser; and the resultant liquid condensate is passed to a decanter where the condensate separates into an upper layer of water insoluble solvent components and a bottom layer of water containing the water soluble solvent components. The upper layer is withdrawn for reuse, and the decanter bottoms stream is passed through another bed of solid adsorbent material which removes the organic solvent so as to produce substantially pure water suitable for discharge or reuse. After a period of use this adsorbent bed is also regenerated by steam stripping, and the effluent steam and solvent vapors are recycled to the same condenser serving the air treating adsorbent bed so that a combined condensate is passed to the decanter.

6 Claims, 1 Drawing Figure

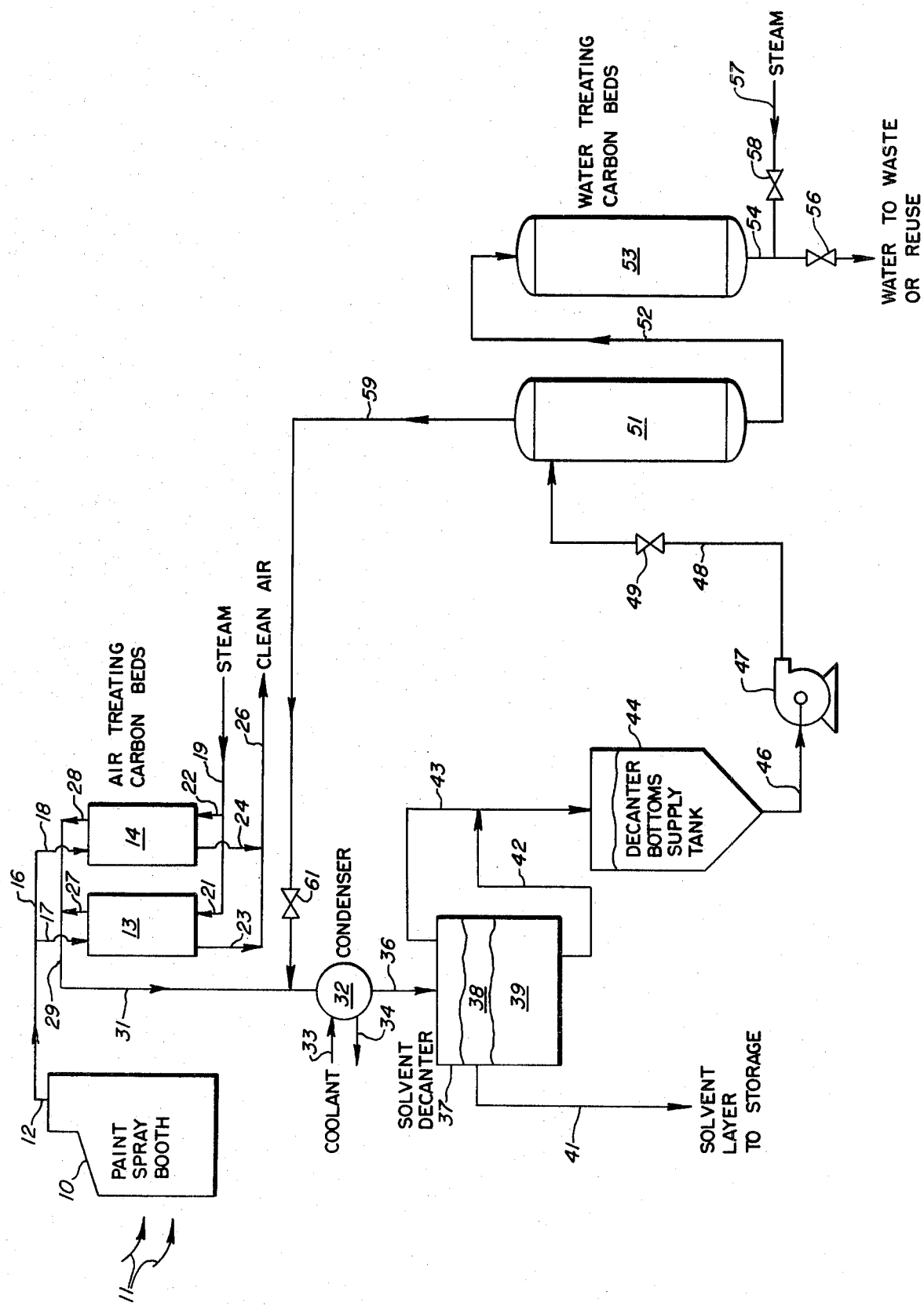

SOLVENT RECOVERY FROM WATER

This invention relates to a novel and improved method and apparatus for recovering solvents from waste water. More particularly, the invention relates to the recovery of water soluble and water insoluble organic solvents from a waste water stream which is discharged from a paint solvent removal system used in treating solvent laden air from a paint spray booth or the like.

In a paint spray booth system an effluent air stream contains significant amounts of mixed solvent vapors which must be removed before the air stream can be vented to the atmosphere. The solvent laden air stream is usually treated in carbon absorption beds to remove the solvent, and the carbon beds are steam stripped periodically to remove the absorbed solvents. The mixture of steam and volatilized solvent is condensed, and the liquid condensate is passed to a decanter where an upper layer of water insoluble solvent is recovered and a bottom layer of water and wate soluble solvent is withdrawn.

The disposal of the bottom layer, which is commonly referred to as "decanter bottoms", presents a serious problem of compliance with environmental regulations because of its dissolved solvent content. Discharge of the decanter bottoms into a sanitary sewer is not always feasible because of biodegradability limitations and because of the extra charges imposed by governmental authorities for handling and treating industrial wastes. Thermal incineration of the decanter bottoms and other oxidation techniques are generally unattractive solutions to the problem because of relatively high combined capital and operating costs. Purification of the decanter bottoms stream by distillation techniques, such as azeotropic distillation, is likewise costly because of the complexity of the typical solvent mixture from a paint spray booth.

Fixed bed activated carbon adsorption is sometimes used for waste water treatment, but such beds cannot be successfully regenerated in situ with stean when the impurities to be removed incude high boiling organic compounds which cannot be desorbed by steaming. Such is frequently the case in waste water treatment generally. In these instances the spent carbon can be removed from the adsorption vessels and regenerated by high temperature oxidation treatment in a special furnace, but this procedure is accompanied by unavoidable oxidation and loss of some of the carbon and is usually uneconomical when relatively small quantities of spent carbon are involved.

However, the decanter bottoms stream associated with a paint spray booth solvent recovery system represents a unique opportunity in that all of the solvent components in the stream are capable of being steam stripped. The present invention takes advantage of this situation to provide a simple and economical solution to the problem of environmentally sound disposal of the decanter bottoms.

Accordingly, a broad object of the present invention is to provide a novel and improved method and apparatus for removing organic solvent vapors from an air or other gaseous stream and recovering the same.

A more particular object of the invention is to provide a novel and improved method and apparatus for recovering water soluble and water insoluble organic solvents from waste water.

A specific object of the invention is to provide a simple and economical method and apparatus for separating and recovering water soluble and water insoluble solvents from a waste water stream which is discharged from a paint solvent removal system associated with a paint spray booth or the like.

In accordance with the present invention a bed of spent solid adsorbent material previously used for removal of mixed solvent vapors from an air or other gaseous stream is steam stripped in the usual manner, the mixture of steam and vaporized solvent is passed through a condenser, and the resultant liquid condensate is passed to a decanter where the condensate separates into an upper layer of water insoluble solvent components and a bottom layer of water containing the water soluble solvent components. The upper layer is withdrawn for reuse, and the decanter bottoms stream is passed through another bed of solid adsorbent material which removes essentially all of the organic solvent so as to produce substantially pure water suitable for discharge or reuse. After a period of use this adsorbent bed is also regenerated by steam stripping, and the effluent steam and solvent vapors are recycled to the same condenser serving the air treating adsorbent bed so that a combined condensate is passed to the decanter. As a result, the content of water soluble solvent in the decanter increases until an equilibrium state is reached where the amount of water soluble solvent removed with the upper layer of water insoluble solvent components is equal to the amount of water soluble solvent being introduced to the condenser and decanter from the air treating adsorbent bed.

The features and advantages of the invention will be explained more fully in connection with the accompanying drawing which is a schematic flow diagram of a preferred embodiment of the inventipon as utilized in conjunction with the purification of an effluent air stream from a paint spray booth.

Referring to the drawing, a paint spray booth or enclosure is designated at 10 in which objects are painted in a known manner using manual or automatic spray guns. The spray booth 10 includes an exhaust fan (not shown) which causes outside air to be drawn into the enclosure, as indicated by the arrows 11, and contaminated air containing solvent vapors is discharged from the enclosure through an exhaust conduit 12. Although large scale industrial spray booths may be of the water-wash type in which the exhaust air is drawn through a water curtain and a baffle section for removing paint overspray and entrained water droplets, the effluent air stream will still contain solvent vapors which, in accordance with customary pollution control regulations, can not be vented to the atmosphere.

Consequently, the solvent laden air stream is passed from line 12 to a plurality of fixed beds of a suitable particulate solid adsorbent material capable of adsorbing the solvent vapors. The preferred adsorbent is gas phase activated carbon, but the invention is not so limited and other known adsorbent solids, such as silica, alumina, and alumino-silicate materials, may be used. Although any desired number of adsorbent beds may be used, for simplicity two such beds 13 and 14 are illustrated. As commonly practiced, the air stream is fed from the line 12 to a manifold 16 and thence through branch lines 17 or 18 to one of the adsorbent beds 13 or 14 while the other adsorbent bed is regenerated in a conventional manner with low-pressure steam fed from a manifold 19 and through one of a pair of branch lines 21 and 22. Clean air is removed from the operative adsorbent bed through a branch line 23 or 24 and is vented from a manifold 26. A mixture of steam and volatilized solvent is withdrawn from the adsorbent bed undergoing regeneration through branch lines 27 and 28 and a manifold 29. Any desired number of adsorbent beds may be used, and it will be understood that suitable valves (not shown) are provided to permit one or more beds to be used for treatment of the air stream while the other beds are being regenerated.

The steam-solvent vapor mixture is passed from the manifold 29 through a line 31 to a condenser 32 having lines 33 and 34 for supplying and removing cooling water or other suitable coolant. The resultant liquid condensate passes from the condenser 32 through a line 36 to a solvent decanter vessel 37 where the condensate settles and separates to form an upper organic solvent phase or layer 38 consisting predominantly of water insoluble solvent components and a lower water phase or decanter bottoms layer 39 containing predominantly the water soluble solvent components. The upper solvent phase 38 is withdrawn through a line 41 to storage.

In a typical paint spray operation, for example, in painting automobile bodies, the paint solvent is a complex mixture of various organic solvents having varying degrees of water solubiity, including hydrocarbons, alcohols, esters, and ketones. The solvent components in the decanter bottoms layer 39 are primarily those solvents which dissolved in the condensed stripping steam from the air treating carbon beds 13 and 14, but limited amounts of water insoluble components will also be present to the extent of their solubility in the water soluble solvent components.

As explained above, the lower water phase or decanter bottoms layer 39 must be treated to remove its solvent content before it can be discharged to waste. In accordance with the present invention, a decanter bottoms stream is withdrawn from the decanter 37 through a discharge line 42 and passed through a connecting line 43 to the upper portion of a decanter bottoms supply tank 44. The line 43 also connects to the upper vapor space of the decanter 37 for equalizing the pressure between the decanter 37 and the supply tank 44. The decanter bottoms liquid is fed through a line 46, a pump 47, and a line 48 containing a valve 49 to a first particulate solid adsorbent bed 51 and thence by a line 52 to a second adsorbent bed 53. The preferred adsorbent material is liquid phase activated carbon, but other known adsorbent materials may be used as indicated above. Clean water substantially free of organic material is then discharged to waste or reuse by a line 54 containing a valve 56.

When the fixed adsorbent beds 51 and 53 have been used for an appropriate period of time, e.g. when they are saturated to about 20% by weight of organic material through much of the bed depth, the beds are then regenerated by introduction of steam through a line 57 having a valve 58. During such regeneration the valves 49 and 56 are closed, and the effluent steam and volatilized solvent are removed from the bed 51 through a line 59 having a valve 61. The line 59 connects with the line 31 so that the steam and desorbed solvent vapors are thereby recycled and introduced into the same condenser 32 that receives the effluent steam and solvent vapors from the air treating beds 13 and 14.

In the illustrated system the beds 51 and 53 are used for adsorption for a period of time, and then both beds are removed from service and regenerated with steam. For example, the beds may be used for treating the decanter bottoms during the day and regenerated at night. However, it will be understood that simultaneous use of one bed for water treatment and regeneration of the other bed may be carried out by a suitable piping and valve arrangement, as heretofore described in connection with the air treating beds 13 and 14.

The combined condensate passes to the decanter 37, as previously described, and therefore the amount of water soluble solvent in the decanter 37 increases relative to the water content as the recycling operation continues. Thus, the content of water soluble solvent components in the decanter bottoms stream gradually builds up. Since the water soluble solvent components are also soluble to a limited extent in the water insoluble solvent phase of the upper layer 38 in the decanter, the accumulated water soluble components are partitioned between the upper layer 38 and the lower layer 39 thereby resulting in the discharge of increased amounts of water soluble solvent components in the water insoluble phase removed from the system through line 41. Continued recycling in the manner described ultimately results in an equilibrium state in which the amount of water soluble components leaving the system in the water insoluble phase discharged from line 41 substantially equals the amount of water soluble components being introduced to the condenser and decanter from line 31. Thus, there is an essentially complete removal and recovery of both the water soluble and water insoluble solvent components.

The following non-limiting specific example provides a practical illustration of the results obtainable by means of the present invention using a system of the type shown in the drawing.

EXAMPLE

An automotive assembly plant operates an assembly line producing 60 vehicles per hour. The body assemblies are painted in a tunnel type downdraft spray booth approximately 60 feet long which is ventilated at an air flow rate of 2000 SCFM/ft or 120,000 SCFM. Paint solvent evaporates from the paint sprayed onto the auto bodies at a rate of 2 gallons per vehicle or 120 gallons per hour.

Most of the paint solvent leaves the spray booth with the ventilation air which is treated for removal of paint overspray in a water curtain scrubber and a series of fixed element replaceable filters. The cleaned solvent-rich air is then treated in a primary adsorption system for removal of both water soluble and water insoluble solvent components. Approximately 99% of the solvent is removed from the air stream which is then suitable for either discharge to the atmosphere or recycle to the spray booths.

The primary adsorption system consists of seven 20,000 SCFM adsorption vessels containing activated carbon, of which six are in continuous operation and one is off-line for regeneration by direct steaming. The solvent entering the adsorption beds is substantially all removed, and the total quantity of solvent leaving the bed being regenerated is equal, on a time average basis, to about 60% of the amount being sprayed, i.e. about 72 gallons/hour or, on a weight basis, about 500 lb/hr.

The mixture of solvent and steam vapors from the primary system is condensed, and the condensate consisting of 500 lb/hr of solvent condensate and 2000 lb/hr of steam condensate is passed through line 36 to the decanter 37, as shown in the drawing, where the upper water insoluble phase 38 is removed through line 41 and the lower water soluble phase 39 is passed through line 42 to the decanter bottoms supply tank 44. The total quantity of solvent supplied to the tank 44 and the solvent composition are shown in the following table:

| Solvent Component | Solubility in Water Parts/100 Parts | PPM | Wt. % | lb/hr |
|---|---|---|---|---|
| n-Butanol | 9 | 3320 | 30.67 | 6.640 |
| Cellosolve Acetate | 22 | 1780 | 16.44 | 3.560 |
| Methyl Isobutyl Ketone | 2 | 1010 | 9.33 | 2.020 |
| n-Butyl Acetate | 0.7 | 873 | 8.07 | 1.746 |
| Pentoxone | — | 844 | 7.80 | 1.688 |
| p-Xylene | insoluble | 615 | 5.68 | 1.230 |
| m-Xylene | insoluble | 543 | 5.02 | 1.086 |
| Ethyl Acetate | 8.5 | 463 | 4.28 | 0.926 |
| Methyl Amyl Ketone | 20 | 418 | 3.86 | 0.836 |
| Toulene (& heptone) | 0.05 | 308 | 2.85 | 0.616 |
| Butyl Cellosolve | ∞ | 235 | 2.17 | 0.470 |
| Cellosolve | ∞ | 231 | 2.13 | 0.462 |
| o-Xylene | insoluble | 184 | 1.70 | 0.358 |
| TOTAL | | 10,824 | 100.00 | 21.648 |

Instead of being discarded as waste, the decanter bottoms is treated in a secondary adsorption system comprising activated carbon beds, as shown in the drawing, to remove the solvent content, and about 500 lb/hr of steam is used to desorb about 100 lb/hr of solvent. Thus, instead of about 20 lb/hr of dissolved water soluble solvent being discarded with 2000 lb/hr of steam condensate, the stream coming from the primary adsorption system is joined by about 100 lb/hr of soluble solvent recycle and about 500 lb/hr of steam from the secondary system. In order to increase the amount of solvent in the water phase to 100 lb/hr, the amount of water soluble solvent in the hydrocarbon product being drained from the decanter increases by about 20 lb/hr, thus providing for the removal of all of the solvent at this point.

The secondary adsorption system removes the water soluble solvent components from the water prior to discard and recycles them to the decanter. In this way, the secondary adsorption system contributes to the recovery of this material. About 500 lb/hr of the upper layer 38 is recovered through line 41, and about 2500 lb/hr of steam condensate is discharged through line 54.

Although the invention has been described with particular reference to certain specific embodiments, it is to be understood that modifications may be resorted to without departing from the scope of the invention as defined in the appended claims.

We claim:

1. A method of treating a solvent laden air stream to remove and recover water soluble and water insoluble solvent components which comprises;
   passing the air stream through an air treating bed of particulate solid adsorbent material capable of removing the solvent components from the air stream,
   regenerating the used air treating bed by passing steam through said air treating bed and desorbing the solvent components,
   passing the resultant mixture of steam and desorbed solvent components to a condenser,
   introducing the resultant condensate from the condenser into a decanter where the condensate separates into an upper solvent phase comprising primarily water insoluble solvent components with a minor amount of water soluble solvent components and a lower water phase containing primarily water soluble solvent components,
   passing said lower water phase through a water treating bed of particulate solid adsorbent material capable of removing the solvent component from the water phase,
   regenerating the used water treating bed by passing steam through the bed and desorbing the solvent components,
   recycling the resultant mixture of steam and desorbed solvent components from said water treating bed to said condenser, whereby to increase the relative content of water soluble solvent components in said lower water phase and also said upper solvent phase, and
   withdrawing said upper solvent phase containing said water insoluble solvent components and the increased content of said water soluble solvent components.

2. The method of claim 1, wherein said solid adsorbent material comprises activated carbon.

3. In a method of treating an effluent air stream from a paint spray booth or the like to remove mixed solvent vapors comprising both water soluble and water insoluble solvent components, wherein the air stream is passed through an air treating bed of particulate solid adsorbent material, the used bed is regenerated by passing steam through the bed and desorbing the solvent components, the resultant mixture of steam and desorbed solvent components is passed to a condenser, the resultant condensate is passed to a decanter to form an upper solvent phase comprising primarily water insoluble solvent components with a minor amount of water soluble solvent components and a lower water phase containing primarily water soluble solvent components, and said upper solvent phase is withdrawn from the system; the improvement which comprises:
   passing said lower water phase through a water treating bed of particulate solid adsorbent material to remove the solvent components from said water phase,
   regenerating the used water treating bed by passing steam through the bed and desorbing the solvent components, and
   recycling the resultant mixture of steam and desorbed solvent components from said water treating bed to said condenser, whereby to increase the relative content of water soluble solvent components in said upper solvent phase which is withdrawn from the system.

4. The method of claim 3, wherein said solid adsorbent material comprises activated carbon.

5. Apparatus for treating a solvent laden air stream to remove and recover water soluble and water insoluble solvent components which comprises:
   air treating means comprising at least one air treating bed of particulate solid adsorbent material capable of removing the solvent components from the air stream,
   means for passing the air stream through said air treating bed,
   means for periodically passing steam through said air treating bed and desorbing the solvent components,
   a condenser, means for passing a mixture of steam and desorbed solvent components from said air treating bed to said condenser, a decanter, means for introducing condensate from said condenser into said decanter where the condensate separates into an upper solvent phase comprising primarily water insoluble solvent components with a minor amount of water soluble solvent components and a lower water phase containing primarily water soluble solvent components, water treating means comprising at least one water treating bed of particulate solid adsorbent material capable of removing the solvent components from the water phase, means for passing the water phase from said decanter through said water treating bed, means for periodically passing steam through said water treating bed and desorbing the solvent components, means for recycling a mixture of steam and desorbed solvent components from said water treating bed to said condenser, and means for withdrawing said upper solvent phase from said decanter.

6. In an apparatus for treating an effluent air stream from a paint spray booth or the like to remove mixed solvent vapors comprising both water soluble and water insoluble solvent components, comprising at least one air treating bed of particulate solid adsorbent material, means for passing the air stream through said air treating bed, means for periodically passing steam through said air treating bed and desorbing the solvent components, a condenser, means for passing a mixture of steam and desorbed solvent components from said air treating bed to said condenser, a decanter, means for introducing condensate from said condenser into said decanter to form an upper solvent phase comprising primarily water insoluble solvent components with a minor amount of water soluble solvent components and a lower water phase containing primarily water soluble solvent components, and means for withdrawing the upper solvent phase from said decanter; the improvement which comprises:

at least one water treating bed of particulate solid adsorbent material, means for passing the water phase from said decanter through said water treating bed, means for periodically passing steam through said water treating bed and desorbing the solvent components, and means for recycling a mixture of steam and desorbed solvent components from said water treating bed to said condenser.

* * * * *